United States Patent
Murphy et al.

(10) Patent No.: US 7,034,487 B1
(45) Date of Patent: Apr. 25, 2006

(54) BARRIER OPERATOR CONTROLLER WITH USER SETTABLE CONTROL LIMITS WHEN ENTRAPMENT DEVICE PRESENT

(75) Inventors: Larry D. Murphy, North Canton, OH (US); Ulrich Theile, Hagen (DE)

(73) Assignee: Overhead Door Corporation, Lewisville, TX (US)

( * ) Notice: Subject to any disclaimer, the term of this patent is extended or adjusted under 35 U.S.C. 154(b) by 0 days.

(21) Appl. No.: 11/171,798

(22) Filed: Jun. 30, 2005

(51) Int. Cl.
*G05B 5/00* (2006.01)
(52) U.S. Cl. .................. 318/466; 318/468; 318/469
(58) Field of Classification Search ............... 318/466, 318/468, 469, 473, 476, 477, 488, 480, 479, 318/280, 286
See application file for complete search history.

(56) References Cited

U.S. PATENT DOCUMENTS

| | | |
|---|---|---|
| 5,218,282 A | 6/1993 | Duhame |
| 6,118,243 A | 9/2000 | Reed et al. |
| 6,873,127 B1 | 3/2005 | Murray |
| 2004/0164693 A1 | 8/2004 | Murray et al. |
| 2004/0195986 A1* | 10/2004 | Fitzgibbon et al. ......... 318/280 |
| 2004/0239269 A1 | 12/2004 | Fitzgibbon et al. |
| 2004/0261317 A1 | 12/2004 | Murray |
| 2005/0088281 A1* | 4/2005 | Rohrberg et al. .......... 340/5.71 |

* cited by examiner

*Primary Examiner*—Karen Masih
(74) *Attorney, Agent, or Firm*—Gardere Wynne Sewell LLP

(57) ABSTRACT

A barrier operator includes a drive motor and a controller for causing the motor to move the barrier between open and closed positions and for monitoring parameters related to forces acting on the barrier during movement thereof. If no external entrapment device is connected to the controller, the controller automatically sets maximum control limit values which will effect stopping or reversing of the motor if an obstruction is encountered by the barrier. If an external entrapment device is connected to the controller, the controller requires a user to set the control limit values at least for movement of the barrier from an open position to a closed position. Audio or visual signal indicators associated with the controller alert the user to the requirement to set the control limits before the operator will effect movement of the barrier.

12 Claims, 3 Drawing Sheets

BARRIER OPERATOR CONTROLLER WITH USER SETTABLE CONTROL LIMITS WHEN ENTRAPMENT DEVICE PRESENT

BACKGROUND OF THE INVENTION

In the art of barrier operators, such as for sectional upward acting garage doors, there have been developments wherein the operator controller will automatically set maximum door closing and opening force limits to one predetermined value when an external entrapment device is present and connected to the controller, and the controller will set the force limits to a lower value when an external entrapment device is not present. However, there are situations wherein the user of the barrier or door will need to set the force limits such as, for example, when the barrier guide structure may become slightly out of position and thus require the door operator to exert greater forces to move the barrier, or when the barrier weight has changed or the barrier is not capable, for various reasons, of being balanced or counterweighted to a point which would permit detection of a predetermined change in the force requirements to move the door. Under such circumstances it is desirable to provide for the user to adjust the force limits as long as an external entrapment device is present and operably connected to the door controller. It is to these ends that the present invention has been developed.

SUMMARY OF THE INVENTION

The present invention provides a barrier operator controller which includes means providing for the user of the operator to set certain control limits, such as maximum forces exerted by the operator when opening and closing the barrier, as long as an external entrapment device is present and operably connected to the operator controller. Examples of external entrapment devices for barriers, such as garage doors, include optical or infrared sensing devices arranged to provide a radiation beam across the doorway adjacent the bottom edge of the door in the closed position to detect obstructions in the path of the door, or a contact type sensor mounted on the bottom edge of the door and operable to send a signal to the door controller if the door bottom edge encounters an obstruction.

The present invention also provides a barrier operator which includes a controller operably connected to a console or control input unit whereby the user of the barrier operator is required to set control limits if the external entrapment device is present before the operator becomes operational. If an external entrapment device is not present and connected to the controller, the controller automatically sets the control limits, such as the maximum force limits which can be exerted by the door in the closing direction and also, if desired, in the opening direction.

Still further in accordance with the invention, there is provided an improved method for setting certain control functions of a door operator controller wherein a user of the operator may interface with the controller and provide certain control limits, such as maximum force limits which the operator may exert on the barrier when moving the barrier to a closed position or to an open position, or both.

Those skilled in the art will further appreciate the advantages and superior features of the invention upon reading the detailed description which follows in conjunction with the drawings.

DETAILED DESCRIPTION OF PREFERRED EMBODIMENTS

Figure 1:
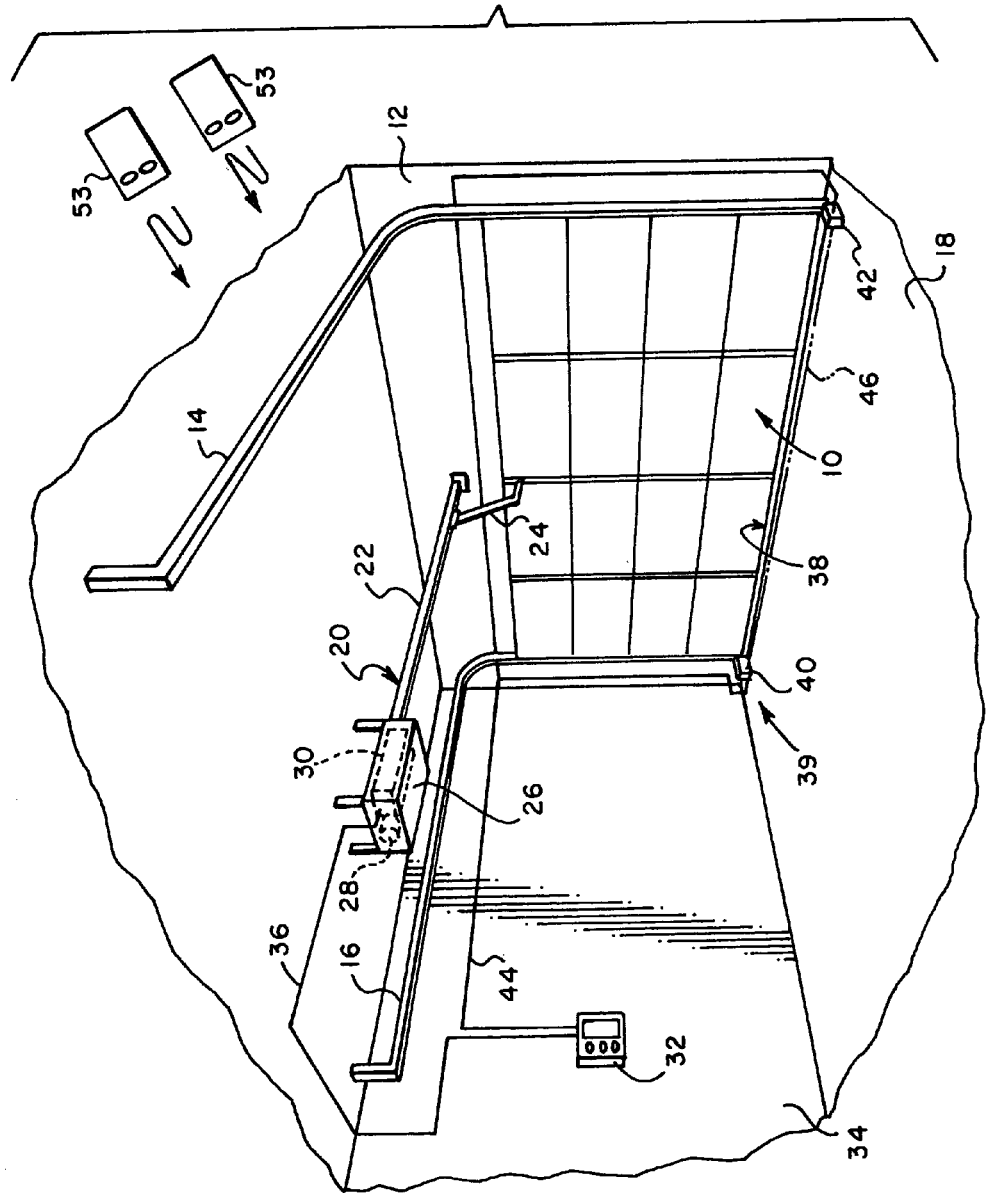
FIG. 1 is perspective view of a barrier comprising a sectional upward acting garage door including an operator and controller in accordance with the invention.

In the description which follows, like parts are marked throughout the specification and drawing with the same reference numerals, respectively. The drawings are not to scale and certain features may be shown schematically or in generalized form in the interest of clarity and conciseness.

Referring to FIG. 1, there is illustrated a movable barrier 10 comprising a sectional upward acting garage door movable between a closed position shown, covering an opening in a wall 12, and an open position guided between opposed sets of guide tracks 14 and 16. In the closed position of the barrier 10, it is typically in sealing engagement with a driveway or floor 18 or at least in close proximity to such a surface. Barrier 10 is movable between its open and closed positions by a motor driven operator 20 which may, in part, be of conventional construction and may be similar to an operator described in U.S. Pat. No. 6,118,243, issued Sep. 12, 2000 to Reed et al., assigned to the assignee of the present invention and incorporated herein by reference. Operator 20 includes an elongated beam 22 supporting a chain or rotatable screw, not shown, such mechanism being operably connected to an arm 24 which, in turn, is connected to the barrier 10. Operator 20 includes a head part 26 partially supporting the beam 22 and supporting a drive motor 28 and a controller 30. Controller 30 is operably connected to a wall console unit 32 suitably supported on a sidewall 34 in a conventional manner. Controller 30 and console 32 may be in communication with each other via hardwire conductor means 36 or via radio frequency communication. For example, the controller 30 and the wall console 32 may each have suitable radio frequency transceivers associated therewith, respectively, providing for communication between these two units.

FIG. 1 illustrates so-called external entrapment devices associated with the barrier or door 10. One external entrapment device comprises an elongated edge sensor 38 of a type known to those skilled in the art which is mounted on the lower edge of the barrier or door 10 and is operable, upon engagement with an obstruction in the doorway, to provide a signal to the controller 30 directly or via the console 32. A second type of external entrapment device 39 is illustrated in FIG. 1, including an optical or infrared beam transmitter 40 disposed on one side of the aforementioned opening or doorway and a receiver 42 disposed on the opposite side of such opening. The transmitter 40 and receiver 42 are operable to send a signal to the controller 30, which may be by way of the console 32 via suitable conductor means 44, for example, if an obstruction breaks a radiation beam 46. The external entrapment device 39, comprising the beam transmitter 40 and receiver 42, may also be of a type known to those skilled in the art. Both external entrapment devices 38 and 39 may be used on a particular barrier although only one of such entrapment devices may be required.

Figure 2:
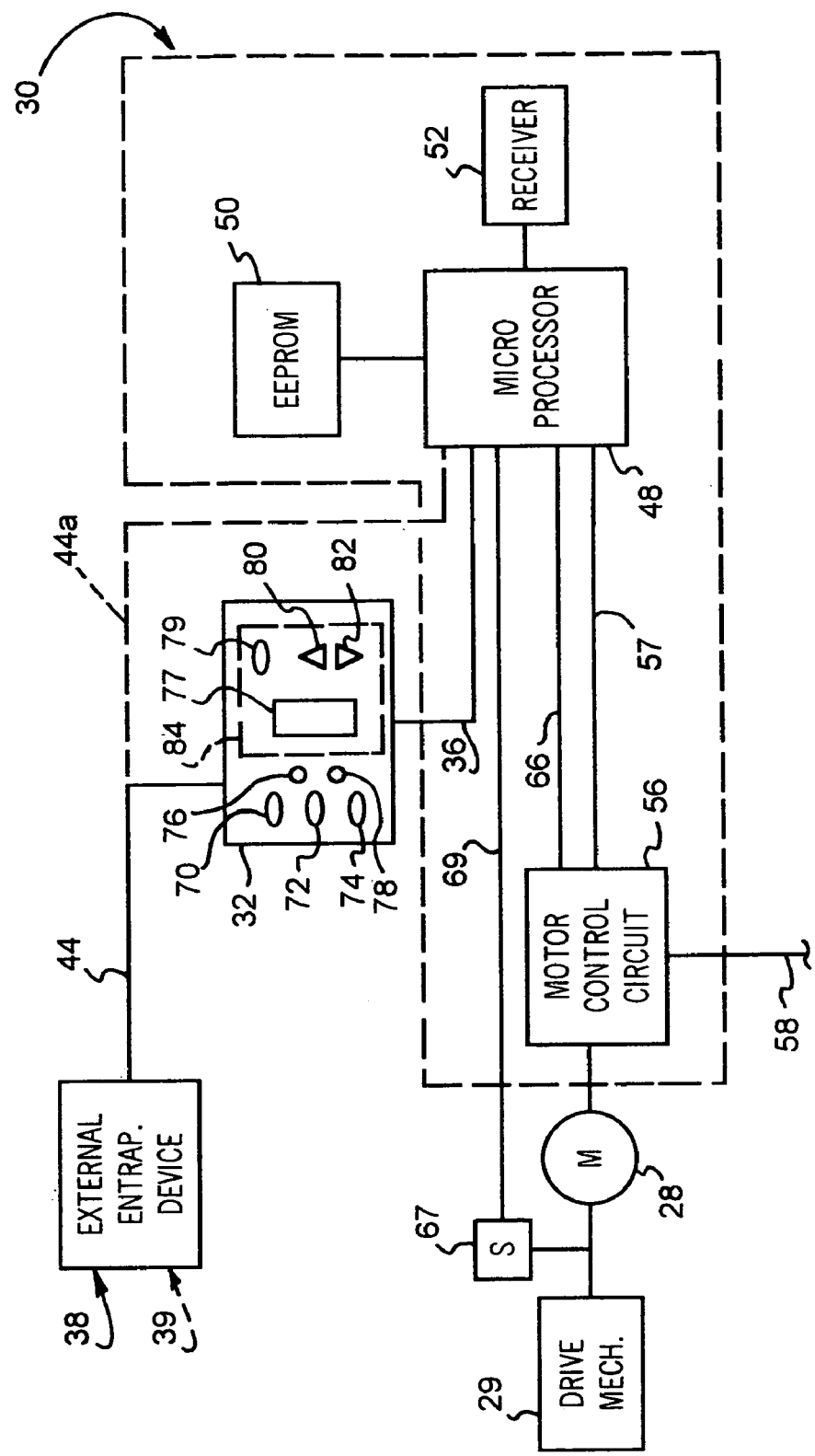
FIG. 2 is a schematic diagram of a controller and its major components for the operator of the invention.

Referring now to FIG. 2, there is illustrated a somewhat generalized schematic diagram of the controller 30, indicating that it is operably connected to the motor 28, which motor is suitably connected to suitable drive mechanism 29 which may comprise the aforementioned screw or flexible chain type drive mechanism for moving the door or barrier 10 between open and closed positions. The controller 30 preferably includes a programmable microprocessor 48 operably connected to an EEPROM electronic memory 50 and to a radio frequency receiver 52. Receiver 52 may also include a suitable transmitter for communicating with the wall console unit 32 and with remote control transmitters 53, FIG. 1, of a type which may be carried in motor vehicles, for example, for use in operating the barrier operator from such vehicles in a known manner. Microprocessor 48 is also operably connected to a motor control circuit 56 via conductor means 57, which control circuit, in turn, is connected to a source of electrical energy 58 and to the motor 28 via conductor means 60. A motor operating parameter, such as electrical current being conducted to the motor 28, as required by the motor to operate the drive mechanism 29 to move the barrier between open and closed positions, may be sensed by suitable current or voltage sensing means included in control circuit 56, for example. A signal corresponding to the magnitude of such current is transmitted to the microprocessor 48 via conductor means 66 so that the magnitude of the current related to motor torque or driving effort can be continuously monitored by the microprocessor. In this way the driving force of the motor 28 exerted when moving the door or barrier 10 between open and closed positions may be continuously monitored by sensing the motor current via conductor means 66. A control circuit wherein motor current is sensed to determine the driving effort of the motor and the force exerted on and by a barrier or door is described in U.S. Pat. No. 6,118,243, for example. Alternatively, or in addition, an operating parameter, such as motor speed or drive mechanism speed may be measured by a sensor 67, FIG. 2, and appropriate speed values input to microprocessor 48 via conductor means 60.

Referring further to FIG. 2, the wall console unit 32 is provided with user interface means including suitable electrical circuitry for communicating with the microprocessor 48, including user operable momentary or so-called pushbutton switches 70, 72 and 74, for example. Switch 70 may be used to command the controller 30 to operate the motor 28 to move the door 10 between open and closed positions. Switch 72 may be used to disenable the controller, such as a so-called vacation lock, and switch 74 may be used to operate a work light, not shown, associated with the operator 20. A visual indicator 76 may be provided to indicate that action is required by the user of the operator to carry out certain acts, such as setting force or speed limits for the operator, and a visual indicator 78 may be used to indicate that the operator is completely enabled and operable. Accordingly, the colors of illumination of the indicators 76 and 78 may be red and green, respectively, for example. The indicators 76 and/or 78 may be audio type indicators also.

Wall console 32 may also include additional control circuitry including a visual display 77, a momentary or pushbutton type enable switch 79 and pushbutton type direction or value switches 80 and 82. Visual display 77 may be used to indicate certain steps to be required of the user and certain values being input by the user, such as motor force limit values or motor speed limit values, for example. Switch 79 may be used to scroll through a menu of activities required of the user and switches 80 and 82 may be used to set values of, for example, force or speed limits to be imposed on the motor 28 of the operator via the control circuitry. Display 77, together with switches 79, 80 and 82 may be, normally, not viewable by the user of the wall console 32 and may require opening a door or the like on the console housing. Accordingly, a user interface or control module 84, which includes the visual display 77, the switches 79, 80 and 82 and associated circuitry, may normally be hidden from view of the user but require access by the user during certain setup procedures for the operator 20. The module 84 may also, in fact, be mounted on the head unit 26 if desired. However, it is convenient for the user to provide the module 84 at the wall console 32 also.

In accordance with the present invention, the controller 30 is operable to establish a set of motor force or speed values comprising a "profile" when the motor is moving the barrier 10 between open and closed positions and such force or speed profile may be stored in the memory 50. For example, initially upon setup of the operator 20, the user would cause the motor 28 to be energized to move the door from an open position to a closed position while the motor current required to do so would be measured by the microprocessor 48 and values of motor current would be stored in the memory 50. Thus a so-called "baseline" motor force "profile" would be established. This same process would be carried out for measuring the motor current or force profile of the motor 28 when moving the door 10 from the closed position to the fully open position.

The microprocessor 48 may be programmed to add a so-called threshold motor current value, corresponding to a motor force value, to the established profile so that, if the total current or force value is exceeded, that is, the baseline value plus the threshold value, the controller 30 would deenergize the motor 28 if the door or barrier 10 was moving from a closed position to an open position, or deenergize and reenergize the motor 28 in a reverse direction if the door was moving from the open position to the closed position. The motor current (force) threshold value would automatically be set in the controller 30 if there was no external entrapment device, such as the device 38 or the device 39, operably connected to the controller 30. In the schematic diagram of FIG. 2, the external entrapment devices 38 and/or 39 are indicated to be connected to the controller 30 by way of the wall console 32 and conductor means 44. Alternatively, the conductor means 44 could be routed directly to the head unit 26 and connected directly to the microprocessor 48, as indicated by the alternate conductor path 44a in FIG. 2. Radio communication between the external entrapment devices 38 and/or 39 and controller 30 may also be provided. The circuitry of controller 30 could be located at console 32, if desired.

The operator 20 is configured such that, if an external entrapment device, such as one or both of the devices 38 and 39, is operably connected to the controller 30 the processor 48 will require a user of the operator 20 to input values for control limits to be established for movement of the door between open and closed positions. In other words, if the external entrapment device 38 and/or 39 is connected to the operator controller 30, upon setup or at a later time, the controller 30 will automatically assume a mode that requires a user of the operator 20 to input control limit values for movement of the door between open and closed positions. The operator 20 will not function to move the door or barrier 10 between open and closed positions until these control limit inputs are provided by the user. As mentioned previously, if the external entrapment devices 38 or 39 are not connected to the operator 20, the user will have no authority over setting control limits, such as motor drive force or motor speed and these limits will be automatically established in the controller 30 by way of programming of the processor 48 at the time of manufacture or at operator setup by a qualified technician.

Figure 3:
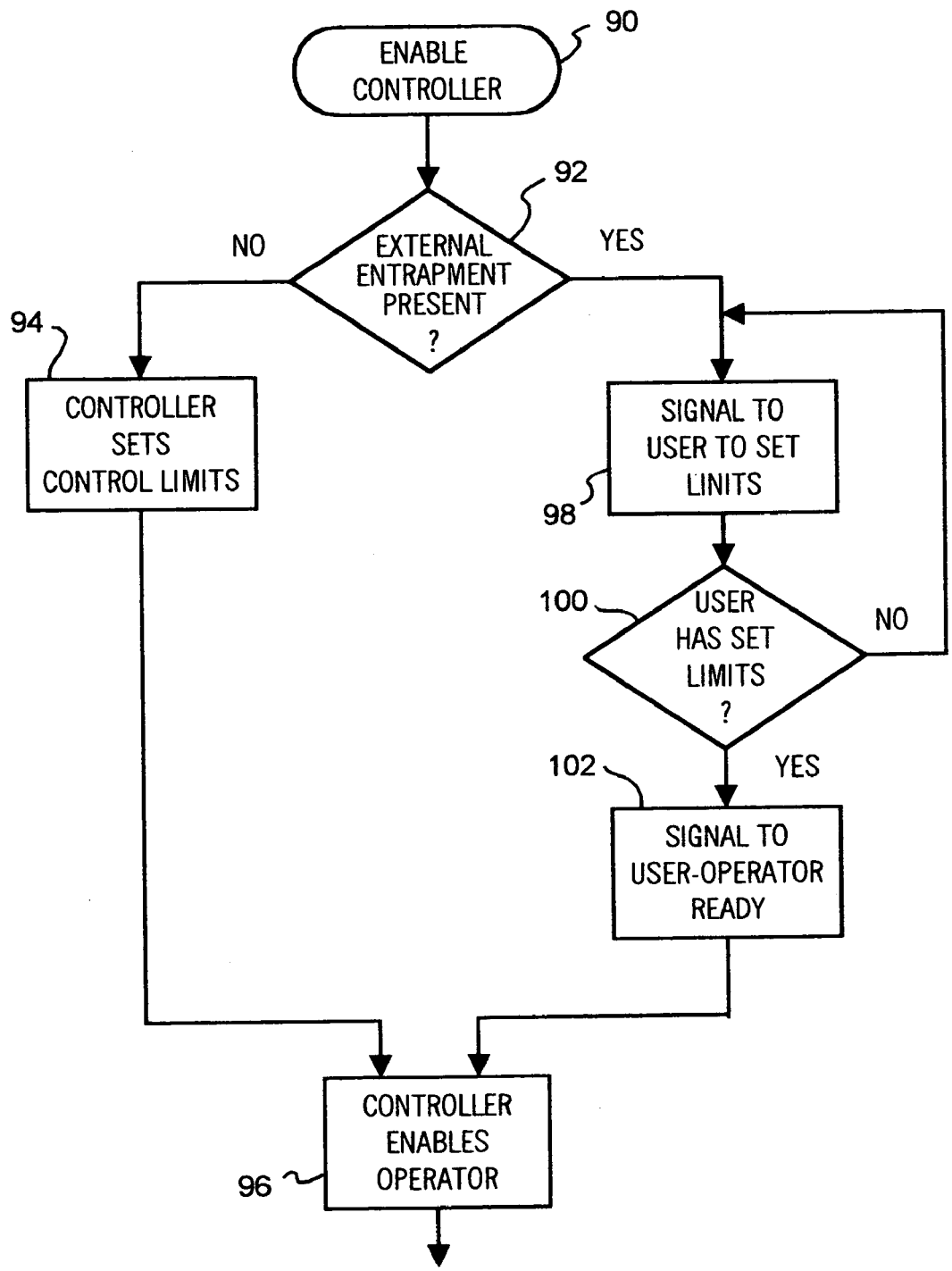
FIG. 3 is a flow diagram illustrating certain basic steps in the operation of the operator controller in accordance with the present invention.

Accordingly, the microprocessor 48 is programmed to carry out the steps illustrated in FIG. 3. As shown in FIG. 3, when the controller 30 is enabled or energized, such as indicted at step 90, the microprocessor 48 proceeds to query at step 92 whether or not an external entrapment device is present. If an external entrapment device 38 and/or 39 is not present and operably connected to the controller 30, the controller will automatically set control limits, such as motor speed or force limits, or both, at step 94 and the operator 20 will be enabled, as indicated at step 96. However, if an external entrapment device is operably connected to the controller 30 at step 92, the microprocessor 48 proceeds to generate a signal to a user of the operator to set control limits. This signal could be provided, for example, by illumination of the indicator 76 or a text message presented on visual display 77. In this state, also, the microprocessor 48 has not enabled the motor control circuit 56 to be operable. So, regardless of whether or not a user tries to actuate the operator 20 via the pushbutton switch 70, or via pushbutton switches associated with the remote transmitters 53, the operator 20 will not move the barrier 10 until the user inputs force or speed limit values to the microprocessor 48 via the control module 84. These inputs may be carried out by a set of steps communicated to the user by way of the visual display 77 or as described in a user's operating manual, not shown.

Once the user has set control limits in accordance with the directions given, and such control limits are recognized by and acceptable to the microprocessor 48, the microprocessor flow will proceed from steps 98 and 100 to step 102 and signal to the user that the operator 20 is ready for use. This signal may be provided by extinguishing the visual indicator 76 and illuminating the indicator 78, for example. If the user has failed to set the control limits at step 100, the indicator 76 will continue to be illuminated or an appropriate message will continue to be presented by display 77 and the operator controller 30 will not respond to commands to move the barrier 10.

Thus, in accordance with the present invention, a user of the operator 20 is required to set certain control limits and is afforded the opportunity to set these limits if an external entrapment device is present and operably connected to the controller 30. This is a desirable feature since, for various reasons, the force required to move the door between open and closed positions may change over time due to misalignment of the guide tracks 14 and 16, wear and tear on the operator, the barrier support structure or any counterbalance mechanism associated with the barrier, for example. Moreover, the weight of the barrier or door may change or be changed by substituting another door structure, for example.

Upon installation of the operator 20 and connection of electrical power thereto, operation of the controller 30 may be initiated by the user by actuating switch 79 until a predetermined menu item appears on the display 77. The user may then move the door 10 to the open position by actuating and holding depressed the switch 80, for example. If the barrier or door 10 was already in the fully open position the user could then initiate a door close cycle by depressing and holding switch 82 until the door reached the closed limit position. During this operation the microprocessor 48 measures the motor current substantially continuously and stores a current "profile" in the memory 50. The processor 48 would be preprogrammed to be capable of adding a threshold value to the motor current profile equivalent to a threshold force differential between that which is normally required by the motor to drive the door 10 and that indicating an obstruction was being encountered by the door. After completion of measuring the motor force (current) profile in the door closing direction, the switch 80 could be depressed and held until the door 10 moved to the fully open position during which time the microprocessor 48 would measure the motor current and store a second motor current profile in the memory 50.

If an external entrapment device 38 and/or 39 was not operably connected to the microprocessor 48, either directly or by way of the console 32, the microprocessor would automatically set predetermined force threshold values to be added to the force (current) profile values stored in the memory 50. However, if one or both external entrapment devices were connected to the controller 30, once the above-mentioned profiles were established and stored in memory 50, the indicator 76 would be illuminated, for example, and/or the display 77 could be caused to prompt the user to set force limit values in both the door opening and closing directions of movement. Appropriate force or speed values could be established by, for example, pressing and holding the pushbutton switch 79 until an appropriate menu item was indicated on the display 77 and then a force or speed value could be entered and could be adjusted by suitable actuation of the switches 80 or 82 so that the door 10 would be operable to move between open and closed positions without stopping and/or reversing prematurely. These limit values could be modified from time to time. Those skilled in the art will recognize that motor speed values could also be set as limits in place of or in addition to force values derived from motor current magnitude or other parameters. After the respective threshold values are set, the switch 79 may be actuated again to cause the force threshold limit values to be entered into the microprocessor 48 and the memory 50 and added to the previously obtained profile values.

The construction and operation of the operator 20, the controller 30 and the method carried out as described herein are believed to be within the purview of one skilled in the art based on the foregoing description. Conventional components, materials and manufacturing practices may be utilized in constructing the operator 20, the controller 30 and in carrying out the inventive method.

Although preferred embodiments of the invention have been described herein, those skilled in the art will recognize that various substitutions and modifications may be made without departing from the scope and spirit of the appended claims.

What is claimed is:

1. A motor driven barrier operator for moving a barrier such as a garage door, between open and closed positions, comprising:

a motor driveably connected to said barrier for moving said barrier between open and closed positions;

a controller including a microprocessor and a memory operably connected to said motor;

a control module including user input control switches for commanding said microprocessor;

an external entrapment device associated with said barrier and adapted to be operably connected to said microprocessor for providing a signal to said microprocessor indicating the presence of said external entrapment device; and wherein said microprocessor is responsive to user input of control limit values when said external entrapment device is connected to said controller to adjust control limits exerted on said barrier by said motor when moving said barrier between an open position and a closed position.

2. The operator set forth in claim 1 including:

indicator means for indicating to a user of said operator when said user is required to input said control limit values to said microprocessor.

3. The operator set forth in claim 1 wherein:

said controller includes means for measuring and storing values related to electrical current input to said motor during operation to move said barrier between said open and closed positions.

4. The barrier operator set forth in claim 1 including:

a visual display for displaying to a user of said operator a condition of said controller requiring user input of information to determine threshold values for establishing said control limits; and user actuatable switches for setting said threshold values in said controller.

5. The barrier operator set forth in claim 4 wherein:

said display is disposed on a wall console operably connected to said controller.

6. The barrier operator set forth in claim 4 wherein:

said display is disposed on an operator head unit, said head unit supporting said motor.

7. A method for adjusting an internal control limit for a motorized barrier operator, comprising:

establishing a profile of at least one operating parameter of a motor for moving said barrier between open and closed limit positions;

storing profile values in a controller associated with said operator;

determining if an external entrapment device is connected to said controller;

causing said controller to automatically set control limit values of said parameter for controlling said motor if said external entrapment device is not connected to said controller; and requiring a user input of control limit values to said controller if said external entrapment device is connected to said controller.

8. The method set forth in claim 7, further comprising:

generating a signal to said user to advise said user of the requirement to set said control limit values.

9. The method set forth in claim 7, including the step of:

requiring said user to set a force threshold value for operation of said barrier when moving from an open position to a closed position.

10. The method set forth in claim 7, including the step of:

requiring said user to set a force threshold value for operation of said barrier when moving from a closed position to an open position.

11. The method set forth in claim 7, including:

providing a user interface including a visual display and at least one pushbutton switch operable to set control limit values.

12. The method set forth in claim 11, wherein:

said user interface includes a pushbutton switch for enabling said user to make inputs of said control limit values, a pushbutton switch for inputting increasing control limit values and a pushbutton switch for inputting decreasing control limit values, respectively, and said method includes the steps of:

initiating a mode of said controller which requires said user to input control limit values for moving said barrier from at least one of an open position to a closed position and a closed position to an open position by actuation of said pushbutton switches, respectively.

\* \* \* \* \*